(12) United States Patent
Shen

(10) Patent No.: US 12,244,336 B2
(45) Date of Patent: Mar. 4, 2025

(54) COMMUNICATION LINK ADJUSTMENT METHOD AND APPARATUS, ELECTRONIC DEVICE, AND READABLE MEDIUM

(71) Applicant: ZTE Corporation, Shenzhen (CN)

(72) Inventor: Shaowu Shen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

(21) Appl. No.: 17/789,560

(22) PCT Filed: Dec. 31, 2020

(86) PCT No.: PCT/CN2020/142374
§ 371 (c)(1),
(2) Date: Jun. 28, 2022

(87) PCT Pub. No.: WO2021/136525
PCT Pub. Date: Jul. 8, 2021

(65) Prior Publication Data
US 2023/0035731 A1 Feb. 2, 2023

(30) Foreign Application Priority Data
Dec. 31, 2019 (CN) .......................... 201911422406.8

(51) Int. Cl.
*H04B 1/00* (2006.01)
*H04B 1/525* (2015.01)

(52) U.S. Cl.
CPC .................. *H04B 1/525* (2013.01)

(58) Field of Classification Search
CPC ....... H04W 28/04; H04W 4/80; H04W 16/14; H04W 24/02; H04W 24/10; H04W 28/18;
(Continued)

(56) References Cited

U.S. PATENT DOCUMENTS 10,938,369 B1 * 3/2021 Gradinaru ................ H03H 7/18
2012/0207032 A1 * 8/2012 Chen ...................... H04W 16/14
370/252
(Continued)

FOREIGN PATENT DOCUMENTS

CN 101043237 A 9/2007
CN 106025548 A 10/2016
(Continued)

OTHER PUBLICATIONS

European Search Report for corresponding application EP20909653; Mail date May 25, 2023.
(Continued)

*Primary Examiner* — Ping Y Hsieh
(74) *Attorney, Agent, or Firm* — CANTOR COLBURN LLP

(57) ABSTRACT

Provided are a communication link adjustment method and apparatus, an electronic device, and a readable medium. The method includes that: interference information of a communication link under a multi-connection scenario is acquired; whether an isolation degree value of the communication link exceeds a range defined by a preset isolation degree threshold is determined according to the interference information; and in a case where the isolation degree value of the communication link exceeds the range defined by the preset isolation degree threshold, the communication link is adaptively adjusted according to the isolation degree value and an isolation degree adjustment mapping table until the isolation degree value meets a requirement for a wireless performance index, wherein the isolation degree adjustment mapping table includes a mapping relationship between isolation degree values and path parameters.

19 Claims, 9 Drawing Sheets

(58) Field of Classification Search
CPC ... H04W 52/243; H04W 92/18; H04W 24/06; H04W 84/12; H04W 84/18; H04W 88/06; H04B 7/0413; H04B 17/318; H04L 1/24; H04L 1/20; Y02D 30/70
See application file for complete search history.

(56) References Cited

U.S. PATENT DOCUMENTS

| | | | |
|---|---|---|---|
| 2013/0315116 A1 | 11/2013 | Chen | |
| 2015/0133185 A1* | 5/2015 | Chen | H04W 72/1215 455/552.1 |
| 2019/0208456 A1* | 7/2019 | Mofidi | H04W 40/02 |
| 2019/0289611 A1* | 9/2019 | Bhattacharya | H04W 52/245 |

FOREIGN PATENT DOCUMENTS

| | | |
|---|---|---|
| CN | 106665628 A | 5/2017 |
| CN | 108183725 A | 6/2018 |
| CN | 108963424 A | 7/2018 |
| CN | 109039397 A | 12/2018 |
| CN | 112118024 A | 12/2020 |
| WO | 2009127690 A1 | 10/2009 |

OTHER PUBLICATIONS

International Search Report for corresponding application PCT/CN2020/142374 filed Dec. 31, 2020. Mail date Mar. 19, 2021.

\* cited by examiner

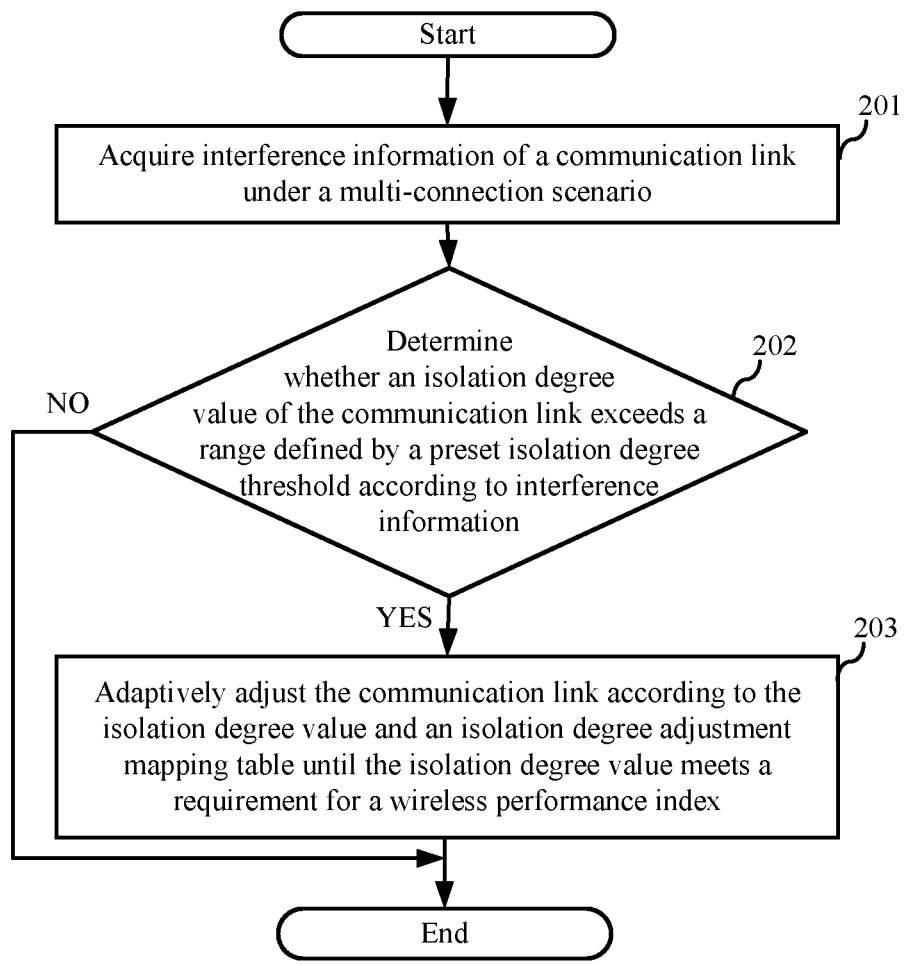

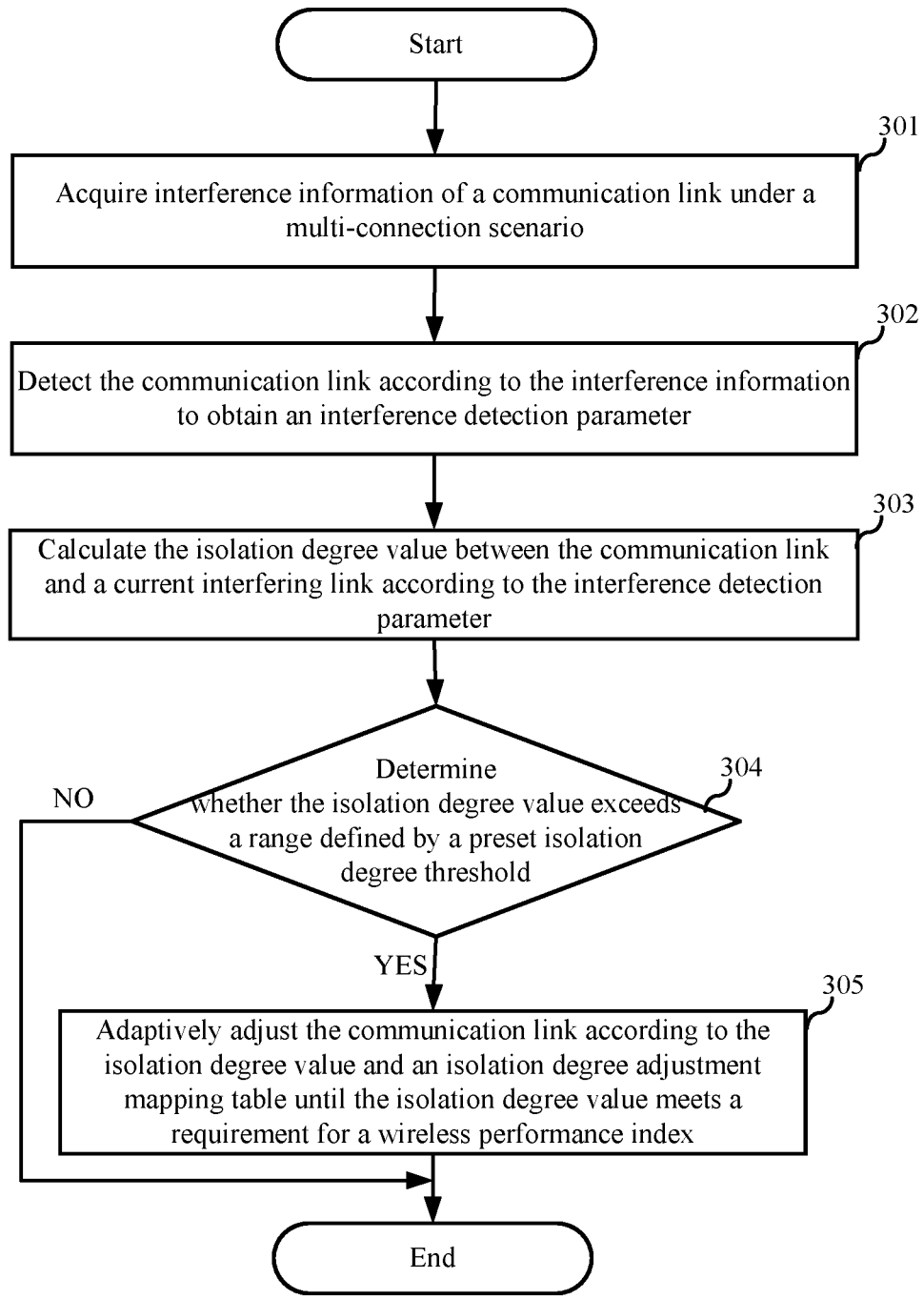

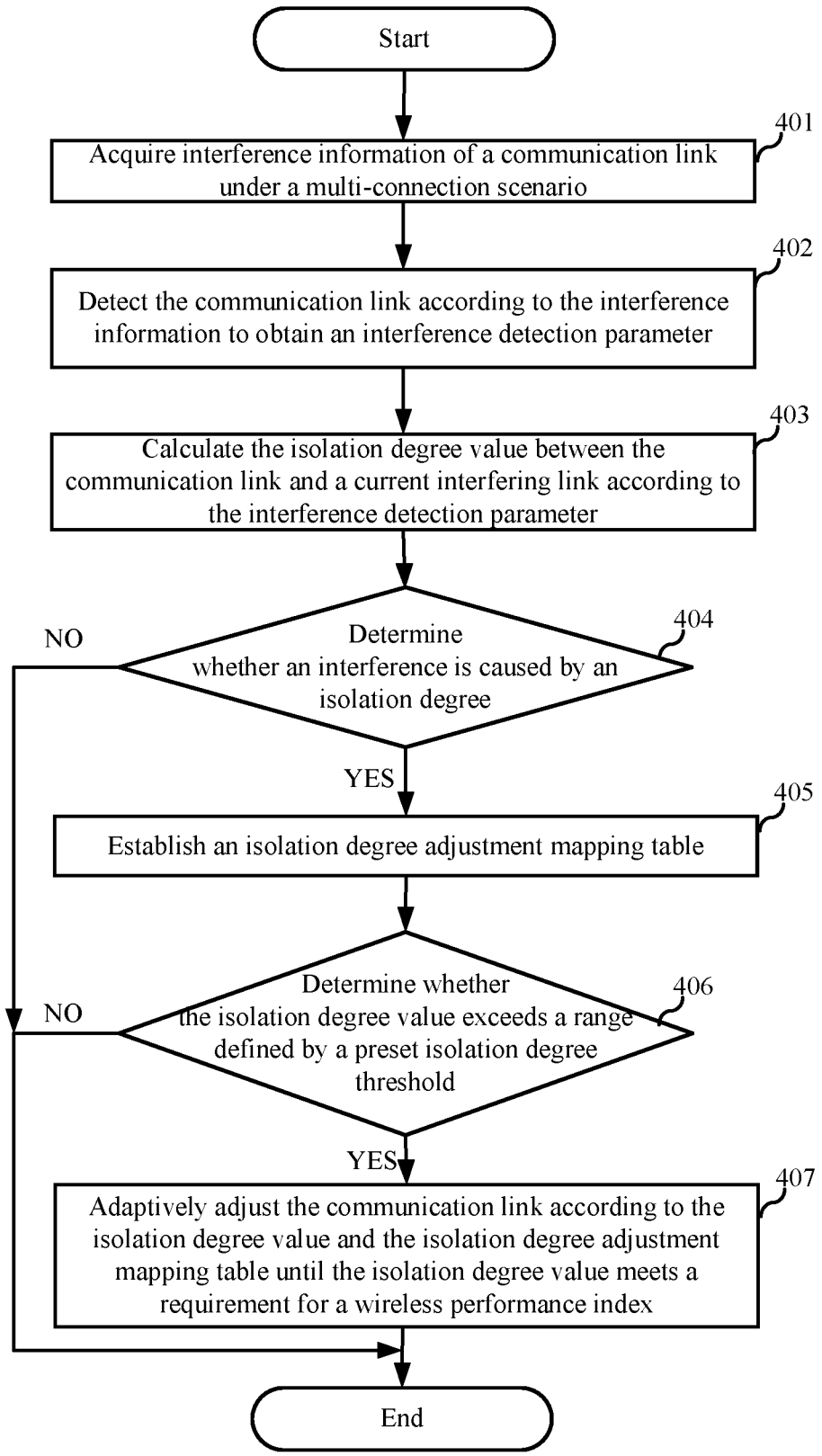

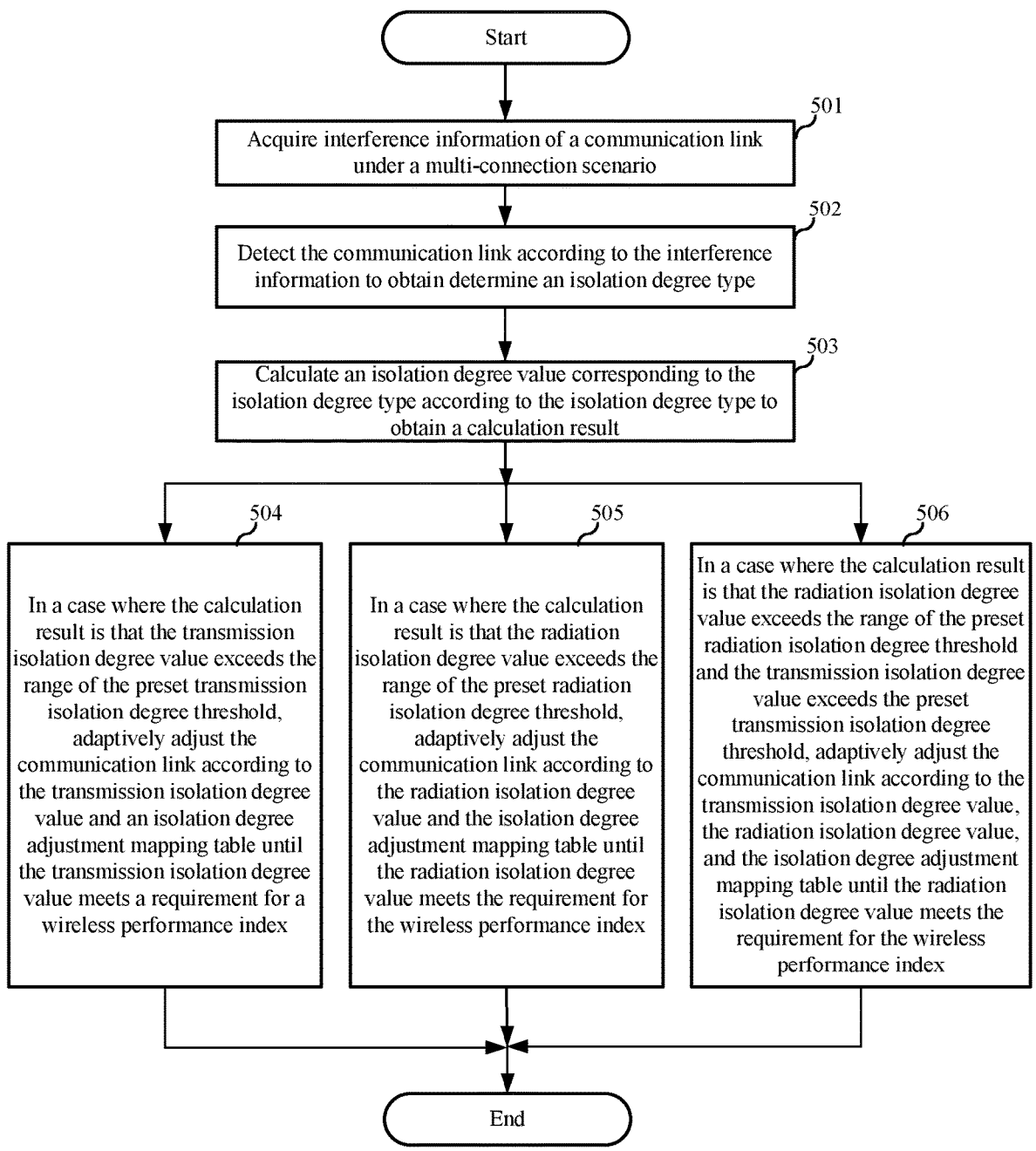
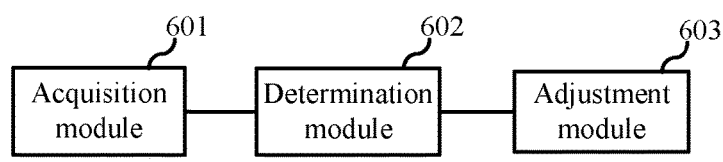

COMMUNICATION LINK ADJUSTMENT METHOD AND APPARATUS, ELECTRONIC DEVICE, AND READABLE MEDIUM

CROSS-REFERENCE TO RELATED APPLICATION

This application is a National Stage Filing of the PCT International Application No. PCT/CN2020/142374 filed on Dec. 31, 2020, which is filed based upon and claims priority to Chinese Patent Application No. 201911422406.8, filed on Dec. 31, 2019, the disclosure of which is hereby incorporated by reference in its entirety.

TECHNICAL FIELD

Embodiments of the present disclosure relate to the technical field of communication, and particularly to a communication link adjustment method and apparatus, an electronic device, and a readable medium.

BACKGROUND

With the development and evolution of 5th Generation Mobile Communication Technology (5G) terminals, mobile terminals have been able to support more and more communication systems and communication bands. In order to meet user requirements, the same mobile terminal is required to be compatible with multiple communication bands such as low, intermediate, and high frequencies. In order to achieve higher data transmission efficiency, a mobile terminal needs to support various communication systems to operate at the same time, and also needs to operate in different communication bands.

SUMMARY

The embodiments of the present disclosure provide a communication link adjustment method, which includes the following operations. Interference information of a communication link under a multi-connection scenario is acquired. Whether an isolation degree value of the communication link exceeds a range defined by a preset isolation degree threshold is determined according to the interference information. In a case where the isolation degree value of the communication link exceeds the range defined by the preset isolation degree threshold, the communication link is adaptively adjusted according to the isolation degree value and an isolation degree adjustment mapping table until the isolation degree value meets a requirement for a wireless performance index, wherein the isolation degree adjustment mapping table includes a mapping relationship between isolation degree values and path parameters.

The embodiments of the present disclosure provide a communication link adjustment apparatus, which includes an acquisition module, a determination module, and an adjustment module. The acquisition module is configured to acquire interference information of a communication link under a multi-connection scenario. The determination module is configured to determine, according to the interference information, whether an isolation degree value of the communication link exceeds a range defined by a preset isolation degree threshold. The adjustment module is configured to, in a case where the isolation degree value of the communication link exceeds the range defined by the preset isolation degree threshold, adaptively adjust the communication link according to the isolation degree value and an isolation degree adjustment mapping table until the isolation degree value meets a requirement for a wireless performance index, wherein the isolation degree adjustment mapping table includes a mapping relationship between isolation degree values and path parameters.

The embodiments of the present disclosure provide an electronic device, which includes: one or more processors; and a memory device, storing one or more programs which are able to be executed by the one or more processors to cause the one or more processors to implement the described communication link adjustment method.

The embodiments of the present disclosure provide a computer-readable medium storing a computer program which is able to be executed by a processor to implement the described communication link adjustment method.

BRIEF DESCRIPTION OF THE DRAWINGS

The drawings, which constitute a part of the specification, are used to provide a further understanding of the embodiments of the present disclosure and explain, together with the embodiments of the present disclosure, the present disclosure, and do not form limitations on the present disclosure. The above and other features and advantages become more apparent to those having ordinary skill in the art upon describing exemplary embodiments with reference to the drawings. In the drawings:

FIG. 2 is a flowchart of a communication link adjustment method according to a first embodiment of the present disclosure;

FIG. 3 is a flowchart of a communication link adjustment method according to a second embodiment of the present disclosure;

FIG. 4 is a flowchart of a communication link adjustment method according to a third embodiment of the present disclosure;

FIG. 5 is a flowchart of a communication link adjustment method according to a fourth embodiment of the present disclosure;

FIG. 6 is a block diagram of a communication link adjustment apparatus according to a fifth embodiment of the present disclosure;

DETAILED DESCRIPTION

Specific embodiments of the present disclosure will be described below in detail in combination with the drawings. It is to be understood that the specific embodiments described herein are only for describing and explaining rather than limiting the present disclosure. Those having ordinary skill in the art may implement the present disclosure without some of these specific details. The following descriptions about the embodiments are only for providing a better understanding of the present disclosure by showing examples of the present disclosure.

It is to be noted that terms "include" and "contain" or any other variations thereof herein are intended to cover nonexclusive inclusions such that a process, method, object, or device including a series of elements not only includes those elements but may also include other elements that are not clearly listed or may further include elements intrinsic to the process, the method, the object, or the device. With no more restrictions, an element defined by statement "including a/an . . . " does not exclude the existence of the same other elements in a process, method, object, or device including the element.

The inventor found that, when more than two wireless technologies, such as LTE, 5G, Wireless Local Area Network (WLAN), and Blue Tooth (BT), are simultaneously supported in a device, two groups of different radio frequency processing units and links are used in the mobile terminal to process two different communication signals, such as an LTE signal and a 5G signal, and the two groups of links need to operate at the same time during the transmission of a signal sent by a chip transceiver to an antenna front-end, namely the 5G link may receive signals while the LTE link sends signals, and the LTE link may receive signals while the 5G link sends signals. In such case, the terminal has the problems of harmonic interference and inter-modulation interference. Due to the existence of a large number of radio frequency paths, when there are two communication connections, for example, LTE and 5G connections, in the mobile terminal, in a case where an LTE path is relatively close to a 5G path, a spatial isolation degree between the LTE path and the 5G path may be quite low, which is likely to cause harmonic interferences and inter-modulation interferences to affect the sensitivity of 5G to further affect the communication performance and bring poor user experiences.

Figure 1:
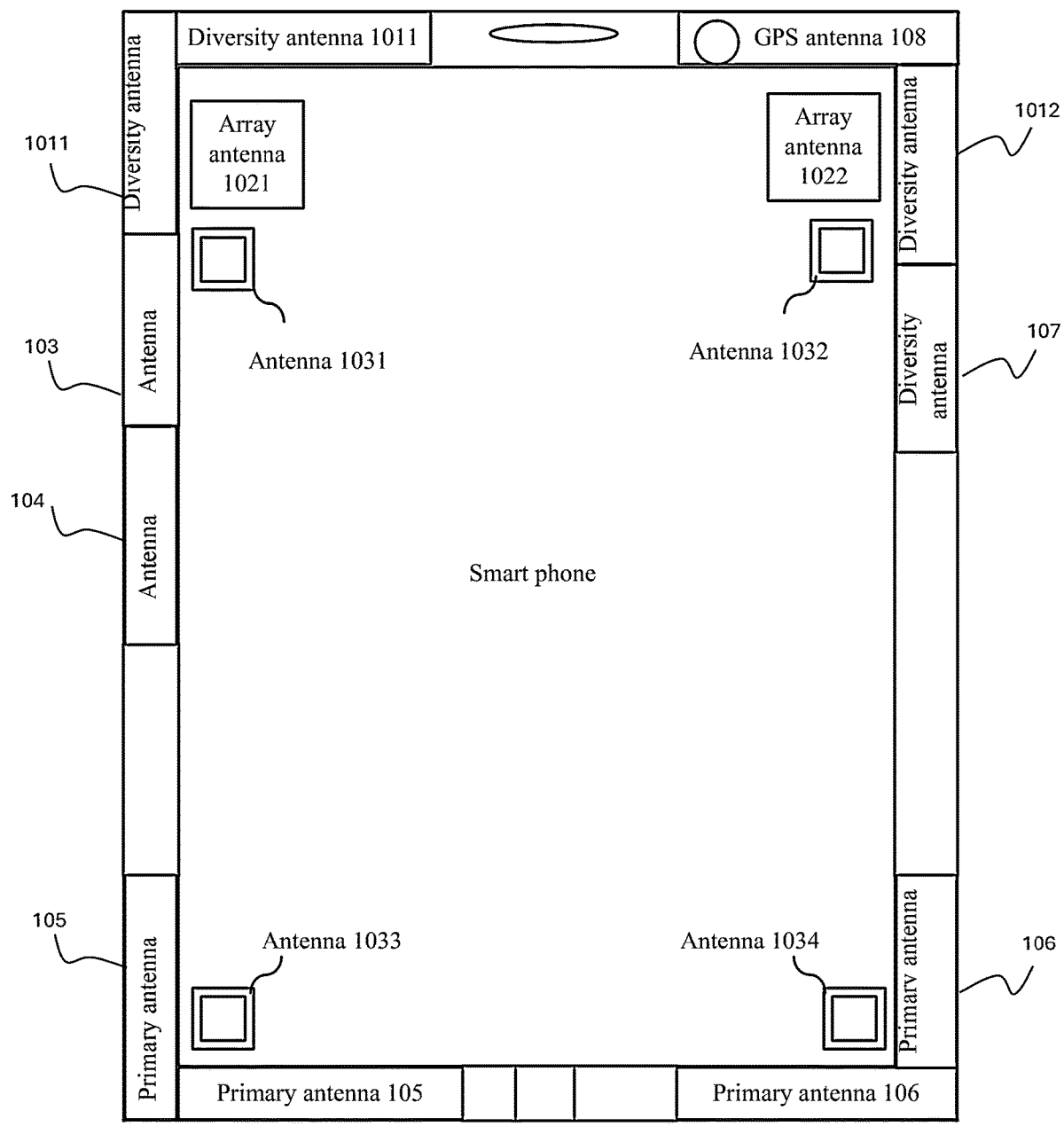
FIG. 1 is a schematic diagram of a commonly used antenna structure of a terminal.

Since an intelligent terminal may support many bands, each band (such as band B1) is further divided into primary and diversity, and a Multi Input Multi Output (MIMO) channel is further divided into a primary MIMO channel and a diversity MIMO channel. FIG. 1 is a schematic diagram of a commonly used antenna structure of a terminal. As shown in FIG. 1, the terminal includes multiple different antennae, such as a primary antenna 106, a diversity antenna 1011, and a diversity antenna 1012 which support 2nd-Generation Mobile Communication Technology (2G)/3rd-Generation Mobile Communication Technology (3G)/4th-Generation Mobile Communication Technology (4G) communication system; an array antenna 1021 and an array antenna 1022 which supports an MMW communication system; an antenna 103 which supports a WIFI/5G communication system; an antenna 1031, an antenna 1032, an antenna 1033, and an antenna 1034 which support a MIMO communication system; an antenna 104 which supports a WIFI/2.4G/BT communication system, a primary antenna 105 and a diversity antenna 107 which support a SUB 6th-Generation Mobile Communication Technology (6G) communication system; and an antenna 108 which supports a Global Positioning System (GPS) communication system.

Each channel passes through different physical devices, and thus many different transmission branch paths may further be divided. The increase of radio frequency channels and paths brings to some extents the problem of low isolation degree for the wiring and layout of each channel on a limited Printed Circuit Board (PCB). Particularly in an Evolved-Universal Mobile Telecommunication System (UMTS) Terrestrial Radio Access Network (E-UTRAN)-NR Dual Connectivity (EN-DC) scenario, a harmonic interference and inter-modulation interference between an LTE band and an NR band affect the communication quality greatly. In a case where a wrong transmission path is selected to cause a low isolation degree with an adjacent path, the sensitivity of an LTE communication link and an NR communication link may be reduced to further affect the communication performance of a user and directly affect the throughput and user experiences. The E-UTRA represents a radio access network in 4G, i.e., Evolved-UMTS Terrestrial Radio Access, where UMTS is Universal Mobile Telecommunication System.

In view of the shortcomings of the conventional art, a communication link adjustment method is needed to adjust a communication link timely when a harmonic interference or an inter-modulation interference is detected, so as to eliminate the harmonic interference or the inter-modulation interference and improve the data throughput and the voice call quality of a user.

In order to facilitate the understanding of the present disclosure, a communication link adjustment method and apparatus, an electronic device, and a readable medium according to the embodiments of the present disclosure will be described below in detail in combination with the drawings. It is to be noted that these embodiments are not intended to limit the scope of the present disclosure.

A first embodiment of the present disclosure relates to a communication link adjustment method. FIG. 2 is a flowchart of a communication link adjustment method according to an embodiment of the present disclosure. The method may be applied to a communication link adjustment apparatus. As shown in FIG. 2, the method includes the following operations.

In operation 201, interference information of a communication link under a multi-connection scenario is acquired.

The interference information includes any one or more of: a channel, a path, and a power of the communication link. The channel may include a channel for communication of the communication link, and signal reception of the communication link in the channel may be affected by an interfering band.

In an exemplary implementation, when a wireless performance index declines, an operating band and a received signal strength of the communication link are acquired according to an enabled band or channel in the communication link. In a case where the received signal strength is beyond a range defined by a preset signal threshold, and the operating band falls in an inter-modulation band or a harmonic band, it is determined that the operating band is an interfering band in the interference information. The wireless performance index at least includes any one of a data throughput or a call voice quality.

It is to be noted that there may be an interfering band in the enabled band and channel. A concrete presentation of the decline of the wireless performance index includes the detection of a data transmission throughput of the communication link being lower than a data transmission throughput of the communication link in case of no interference, or obvious non-fluency during a voice call of the user, or the reduction of main-diversity signal strength in a communication system used by the communication link, or fewer than three signal bars being displayed in a user interface, etc.

The above description about the decline of the wireless performance index is only an example, and the decline of the wireless performance index may specifically be determined according to an actual situation. Other unspecified declines of the wireless performance index also fall within the scope of protection of the present disclosure, and will not be elaborated herein.

In operation 202, whether an isolation degree value of the communication link exceeds a range defined by a preset isolation degree threshold is determined according to the interference information.

It is to be noted that operation 203 is performed in a case where it is determined that the isolation degree value of the communication link exceeds the range defined by the preset isolation degree threshold, otherwise the process ends.

In operation 203, the communication link is adaptively adjusted according to the isolation degree value and an isolation degree adjustment mapping table until the isolation degree value meets a requirement for a wireless performance index.

The isolation degree adjustment mapping table includes a mapping relationship between isolation degree values and path parameters.

It is to be noted that the above parameter in the isolation degree adjustment mapping table is only an example. The parameters may specifically be set according to an actual situation. Other unspecified parameters also fall within the scope of protection of the present disclosure, and will not be elaborated herein.

In this embodiment, whether the isolation degree value of the communication link exceeds the range defined by the preset isolation degree threshold is determined according to the interference information, and in a case where the isolation degree value of the communication link exceeds the range defined by the preset isolation degree threshold, the communication link is adaptively adjusted according to the isolation degree value and the isolation degree adjustment mapping table until the isolation degree value after adjustment meets the requirement for the wireless performance index. Mutual interferences of communication links in the multi-connection scenario are reduced, the data throughput is improved, and meanwhile, the voice call quality of the user and user experiences are improved.

A second embodiment of the present disclosure relates to a communication link adjustment method. The second embodiment is substantially the same as the first embodiment. The main difference lies in that: the communication link is detected according to the interference information to obtain an interference detection parameter, and then the isolation degree value between the communication link and a current interfering link is calculated according to the interference detection parameter.

FIG. 3 is a flowchart of the communication link adjustment method in the present embodiment. A communication link is adjusted by the following operations, specifically including operations 301 to 305.

In operation 301, interference information of a communication link under a multi-connection scenario is acquired.

It is to be noted that contents about operation 301 in the present embodiment are the same as those about operation 201 in the first embodiment, and will not be elaborated herein.

In operation 302, the communication link is detected according to the interference information to obtain an interference detection parameter.

In an exemplary implementation, the communication link is detected in a self-transmitting and self-receiving test mode according to the interference information to obtain the interference detection parameter.

For example, an LTE communication link is used as a transmitter, and an NR communication link is used as a receiver. In such case, any one or more of a channel, a path, and a power in the NR communication link are tested to obtain an interference detection parameter. The interference detection parameter at least includes any one of a Signal Noise Ratio (SNR), a Reference Signal Receiving Power (RSRP), or a Received Signal Strength Indication (RSSI).

In operation 303, the isolation degree value between the communication link and a current interfering link is calculated according to the interference detection parameter.

For example, when the interference detection parameter includes the RSRP, it is assumed a certain intelligent terminal has four antennae S1, S2, S3, and S4, S21 represents an isolation degree of antenna S2 relative to antenna S1, S31 represents an isolation degree of antenna S3 relative to antenna S1, and S41 represents an isolation degree of antenna S4 relative to antenna S1. Under software control, an acquired RSRP value is recorded R1 when only antenna S1 is enabled, and an acquired RSRP value is recorded as R2 when antenna S1 and antenna S2 are enabled at the same time. Then, the isolation degree between antenna S1 and antenna S2 is calculated through the following formula: isolation degree $S21=(R2-R1)T$, where T represents a correlation coefficient between RSRP and an isolation degree.

In operation 304, whether the isolation degree value exceeds a range defined by a preset isolation degree threshold is determined.

The operation 305 is performed in a case where the isolation degree value of the communication link exceeds the range defined by the preset isolation degree threshold, otherwise the process ends.

In operation 305, in a case where the isolation degree value of the communication link exceeds the range defined by the preset isolation degree threshold, the communication link is adaptively adjusted according to the isolation degree value and an isolation degree adjustment mapping table until the isolation degree value meets a requirement for a wireless performance index.

It is to be noted that contents about operations 304 to 305 in the present embodiment are the same as those about operations 202 to 203 in the first embodiment, and will not be elaborated herein.

In the present embodiment, the communication link is scanned and tested with an interfering band to obtain the interference detection parameter, and the isolation degree value is further calculated according to the interference detection parameter. Therefore, whether the communication link needs to be adjusted may be determined according to the isolation degree value, and the communication link may be adjusted for an interference to eliminate the influence of the interference on communication and ensure the communication quality.

A third embodiment of the present disclosure relates to a communication link adjustment method. The third embodiment is substantially the same as the second embodiment. The main difference lies in that: after the isolation degree value is calculated, it is further necessary to determine whether an interference is caused by an isolation degree, and in a case where the interference is caused by the isolation degree, the isolation degree adjustment mapping table is established such that the isolation degree adjustment mapping table may be queried subsequently to obtain a corresponding path parameter needed to be adjusted.

As shown in FIG. 4, the communication link adjustment method includes the following operations.

In operation 401, interference information of a communication link under a multi-connection scenario is acquired.

In operation 402, the communication link is detected according to the interference information to obtain an interference detection parameter.

In operation 403, the isolation degree value between the communication link and a current interfering link is calculated according to the interference detection parameter.

It is to be noted that contents about operations 401 to 403 in the present embodiment are the same as those about operations 301 to 303 in the second embodiment, and will not be elaborated herein.

In operation 404, whether an interference is caused by an isolation degree is determined. The operation 405 is performed in a case where it is determined that the interference is caused by the isolation degree, otherwise the process ends.

For example, the preset isolation degree threshold is set to −20 DB. When the isolation degree of the communication link obtained by testing is lower than −20 DB, it indicates that the communication links are isolated well, and the communication link needs not to be adjusted. Otherwise, in a case where the isolation degree of the communication link obtained by testing is more than or equal to −20 DB, it indicates that the communication links are isolated not so well, and the communication link needs to be adjusted. In such case, operation 405 is performed, thereby improving the isolation degree between the communication links.

In operation 405, an isolation degree adjustment mapping table is established.

In some cases, the isolation degree adjustment mapping table may include a mapping relationship between isolation degree values and path parameters, and may further include an operating band, operating frequency point, related configuration parameter, etc., of the communication link. The isolation degree adjustment mapping table may be queried to rapidly obtain a path needed to be adjusted according to the above parameters and the related mapping relationship, thereby improving the communication link adjustment efficiency.

In operation 406, whether the isolation degree value exceeds a range defined by a preset isolation degree threshold is determined.

The operation 407 is performed in a case where the isolation degree value of the communication link exceeds the range defined by the preset isolation degree threshold, otherwise the process ends.

In operation 407, in a case where the isolation degree value of the communication link exceeds the range defined by the preset isolation degree threshold, the communication link is adaptively adjusted according to the isolation degree value and the isolation degree adjustment mapping table until the isolation degree value meets a requirement for a wireless performance index.

It is to be noted that contents about operations 406 to 407 in the present embodiment are the same as those about operations 304 to 305 in the second embodiment, and will not be elaborated herein.

In some embodiments, after operation 407 is performed, the method further includes that: in a case where a new wireless configuration parameter is detected, the isolation degree adjustment mapping table is updated, the wireless configuration parameter including at least one of an operating band, a bandwidth, a Resource Block (RB) count, a slot count, and a modulation scheme.

For example, in a case where it is detected that the isolation degree adjustment mapping table does not include the operating band and modulation scheme for the current adjusted communication link, or a corresponding path parameter is not latest, the isolation degree adjustment mapping table is updated with a latest path parameter obtained by testing, the operating band, and the modulation scheme.

In the present embodiment, the isolation degree adjustment mapping table is established, so that the path parameter of the communication link needed to be adjusted may be found rapidly during the adjustment of the communication link to further adjust the communication link according to the path parameter. The adjustment speed is increased, the communication quality is improved, thereby meet user requirements and improving user experiences.

A fourth embodiment of the present disclosure relates to a communication link adjustment method. The fourth embodiment is substantially the same as the first embodiment. The main difference lies in that the communication link is classified for adaptive adjustment according to an isolation degree type and a corresponding isolation degree value.

As shown in FIG. 5, the communication link adjustment method includes the following operations.

In operation 501, interference information of a communication link under a multi-connection scenario is acquired.

It is to be noted that contents about operation 501 in the present embodiment are the same as those about operation 201 in the first embodiment, and will not be elaborated herein.

In operation 502, the communication link is detected according to the interference information to obtain determine an isolation degree type.

The isolation degree type includes a transmission isolation degree and a radiation isolation degree. An isolation degree is an interference suppression measure adopted to maximally reduce influences of various interferences on the communication link. The transmission isolation degree refers to, for transmission paths, an isolation degree between two or more transmission paths. For example, in a case where both path A and path B may transmit a generated signal to a receiver, an isolation degree between path A and path B is referred to as a transmission isolation degree. The radiation isolation degree refers to an isolation degree generated by the transmission of signals between different transmitting antennae or receiving antennae.

In operation 503, an isolation degree value corresponding to the isolation degree type is calculated according to the isolation degree type to obtain a calculation result.

The calculation result includes that a transmission isolation degree value exceeds a range defined by a preset transmission isolation degree threshold, and/or, a radiation isolation degree value exceeds a range defined by a preset radiation isolation degree threshold.

For example, the calculation result is obtained by calculating a difference between the transmission isolation degree and the preset transmission isolation degree threshold and then comparing the obtained difference with the preset threshold, or by directly comparing magnitudes of the transmission isolation degree and the preset transmission isolation degree threshold. Similarly, a calculation process for the radiation isolation degree is the same as that for the transmission isolation degree.

In operation 504, in a case where the calculation result is that the transmission isolation degree value exceeds the range defined by the preset transmission isolation degree threshold, the communication link is adaptively adjusted according to the transmission isolation degree value and an isolation degree adjustment mapping table until the transmission isolation degree value meets a requirement for a wireless performance index.

It is to be noted that adaptively adjusting the communication link according to the transmission isolation degree value and the isolation degree adjustment mapping table may solve the problem of PCB-level isolation degree, such as isolation between radio frequency lines, isolation of vias, and isolation of reference ground wires.

For example, in a case where a transmission isolation degree of transmission path A obtained by testing is −40 DB, exceeding the range defined by the preset transmission isolation degree threshold (for example, the preset transmission isolation degree threshold is set to −30 DB), transmission path A is switched to transmission path B with a high isolation degree and subjected to a little interference. In a case where the transmission isolation degree after adjustment by testing is less than −30 DB, the transmission path adjustment ends. Otherwise, transmission path switching adjustment is continued until the transmission isolation degree value meets the requirement for the wireless performance index.

In operation 505, in a case where the calculation result is that the radiation isolation degree value exceeds the range defined by the preset radiation isolation degree threshold, the communication link is adaptively adjusted according to the radiation isolation degree value and the isolation degree adjustment mapping table until the radiation isolation degree value meets the requirement for the wireless performance index.

It is to be noted that adaptively adjusting the communication link according to the radiation isolation degree value and the isolation degree adjustment mapping table may solve the problem of spatial radiation isolation degree, such as isolation of spatial couplings, and isolation degree between radio frequency antennae.

For example, in a case where a radiation isolation degree of radiation path M obtained by testing is −25 DB, exceeding the range defined by the preset radiation isolation degree threshold (for example, the preset radiation isolation degree threshold is set to −35 DB), radiation path M is switched to radiation path N with a high isolation degree and subjected to a little interference. In a case where the radiation isolation degree after adjustment by testing is less than −35 DB, the radiation path adjustment ends. Otherwise, radiation path switching adjustment is continued until the radiation isolation degree value meets the requirement for the wireless performance index.

In operation 506, in a case where the calculation result is that the radiation isolation degree value exceeds the range defined by the preset radiation isolation degree threshold and the transmission isolation degree value exceeds the range defined by the preset transmission isolation degree threshold, the communication link is adaptively adjusted according to the transmission isolation degree value, the radiation isolation degree value, and the isolation degree adjustment mapping table until the radiation isolation degree value meets the requirement for the wireless performance index.

Both conditions that the radiation isolation degree value exceeds the range defined by the preset radiation isolation degree threshold and the transmission isolation degree value exceeds the range defined by the preset transmission isolation degree threshold are satisfied, so that a transmission path and radiation path in the communication link need to be adjusted at the same time until the radiation isolation degree value meets the requirement for the wireless performance index.

It is to be noted that, in some embodiments, when the communication link is adjusted, a path parameter and the isolation degree value may further be displayed in real time. For example, the isolation degree value, related transmission path, and other information of the current communication link are displayed in real time for testing adjustment.

In some embodiments, the communication link under the multi-connection scenario at least includes any two of a 4G-based communication link, a 5G-based communication link, a GPS-based communication link, a BT-based communication link, and a WIFI-based communication link.

For example, the communication link under the multi-connection scenario may include any two of the following communication links: various links supporting different communication protocol types, such as an LTE communication link, an NR communication link, a GPS communication link, and a WIFI communication link.

In the present embodiment, the communication link is scanned and tested with an interfering band to determine the isolation degree type. Then, the isolation degree value corresponding to the isolation degree type is calculated according to different isolation degree types to obtain the calculation result. In a case where the calculation result includes several different conditions, the communication link is adaptively adjusted according to the isolation degree adjustment mapping table. Therefore, the communication link can be adjusted more accurately, different types of interferences can be reduced until the interferences are eliminated, the communication quality is improved, and user experiences are further improved.

The above division of the operations of each method is only for clarity of description. During implementation, the operations may be combined into one operation, or some operations may be split into multiple operations, and any solution including the same logical relationship falls within the scope of protection of this patent. Adding insignificant modifications or introducing insignificant designs to the algorithm or flow without changing the core design of the algorithm or flow falls within the scope of protection of this patent.

A fifth embodiment of the present disclosure relates to a communication link adjustment apparatus. Specific implementation of the apparatus may refer to the related descriptions in the first embodiment, and repeated parts will not be elaborated. It is to be noted that specific implementation of the apparatus in the present embodiment may also refer to the related descriptions in the second to fourth embodiments, but is not limited to the above embodiments, and other unspecified embodiments also fall within the scope of protection of the apparatus.

Figure 7:
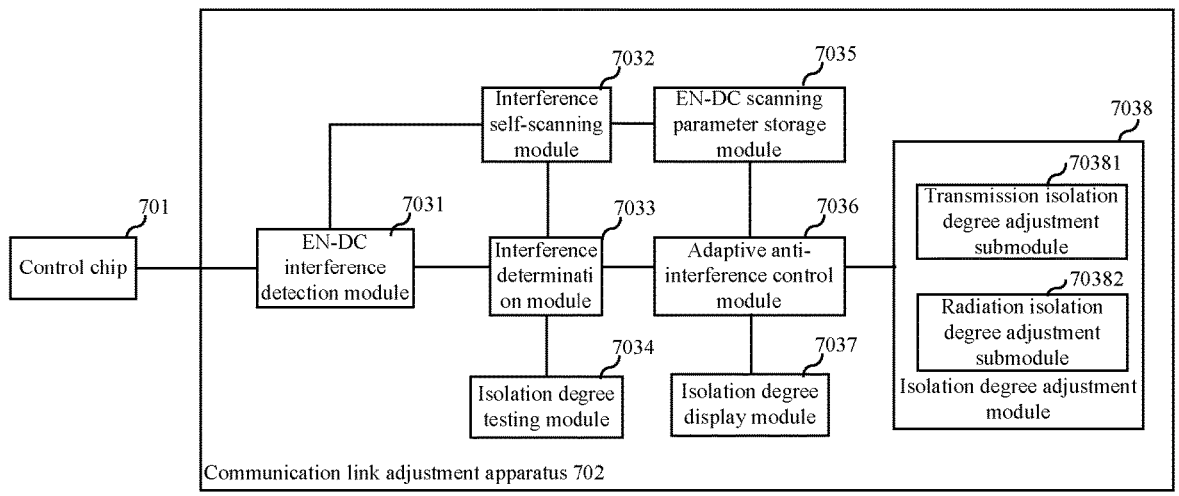
FIG. 7 is a structural block diagram of a terminal according to a sixth embodiment of the present disclosure.

FIG. 6 is a block diagram of the communication link adjustment apparatus in the present embodiment. As shown in FIG. 7, the communication link adjustment apparatus mainly includes an acquisition module 601, a determination module 602, and an adjustment module 603. The acquisition module 601 is configured to acquire interference information of a communication link under a multi-connection scenario. The determination module 602 is configured to determine, according to the interference information, whether an isolation degree value of the communication link exceeds a range defined by a preset isolation degree threshold. The adjustment module 603 is configured to, in a case where the isolation degree value of the communication link exceeds the range defined by the preset isolation degree threshold, adaptively adjust the communication link according to the isolation degree value and an isolation degree adjustment mapping table until the isolation degree value meets a requirement for a wireless performance index, wherein the isolation degree adjustment mapping table includes a mapping relationship between isolation degree values and path parameters.

In the present embodiment, the acquisition module acquires the interference information. Then, the determination module determines, according to the interference information, whether the isolation degree value of the communication link exceeds the range defined by the preset isolation degree threshold. In a case where the isolation degree value of the communication link exceeds the range defined by the preset isolation degree threshold, the adjustment module adaptively adjusts the communication link according to the isolation degree value and the isolation degree adjustment mapping table until the isolation degree value after adjustment meets the requirement for the wireless performance index. Mutual interferences of communication links in the multi-connection scenario are reduced, and the data throughput is improved.

It is not difficult to find that the present embodiment is an apparatus embodiment corresponding to the first or second embodiment, and may be matched for implementation with the first or second embodiment. The related technical details mentioned in the first or second embodiment are still effective in the present embodiment, and to reduce repetitions, will not be elaborated herein. Correspondingly, the related technical details mentioned in the present embodiment may also be applied to the first or second embodiment.

It is to be noted that each module involved in the present embodiment is a logical module. In practical applications, a logical unit may be implemented as a physical unit, or a part of a physical unit, or a combination of multiple physical units. In addition, in order to highlight innovations of the present disclosure, units related not so closely to solving the technical problem mentioned in the present disclosure are not introduced into the present embodiment, but it does not mean no other units exist in the present embodiment.

A sixth embodiment of the present disclosure relates to a terminal. The terminal includes the communication link adjustment apparatus in the fifth embodiment.

FIG. 7 is a structure diagram of a terminal including a communication link adjustment apparatus. As shown in FIG. 7, the terminal includes a control chip 701 and a communication link adjustment apparatus 702. The communication link adjustment apparatus 702 may specifically include an EN-DC interference detection module 7031, an interference self-scanning module 7032, an interference determination module 7033, an isolation degree testing module 7034, an EN-DC scanning parameter storage module 7035, an adaptive anti-interference control module 7036, an isolation degree display module 7037, an isolation degree adjustment module 7038, a transmission isolation degree adjustment submodule 70381, and a radiation isolation degree adjustment submodule 70382.

It is to be noted that EN-DC represents an EN-DC scenario of an E-TRAN and a next-generation network. In the EN-DC scenario, User Equipment (UE) simultaneously supports communication of two communication links, i.e., an LTE communication link and an NR communication link respectively.

The terminal includes communication links based on two different communication systems, e.g., an LTE communication link and an NR communication link, and thus an EN-DC interference may be generated. The communication link adjustment apparatus can achieve an anti-interference effect to further eliminate a harmonic interference or an inter-modulation interference, improve a data throughput of the terminal, and meanwhile, improve the voice call quality of a user.

Figure 8:
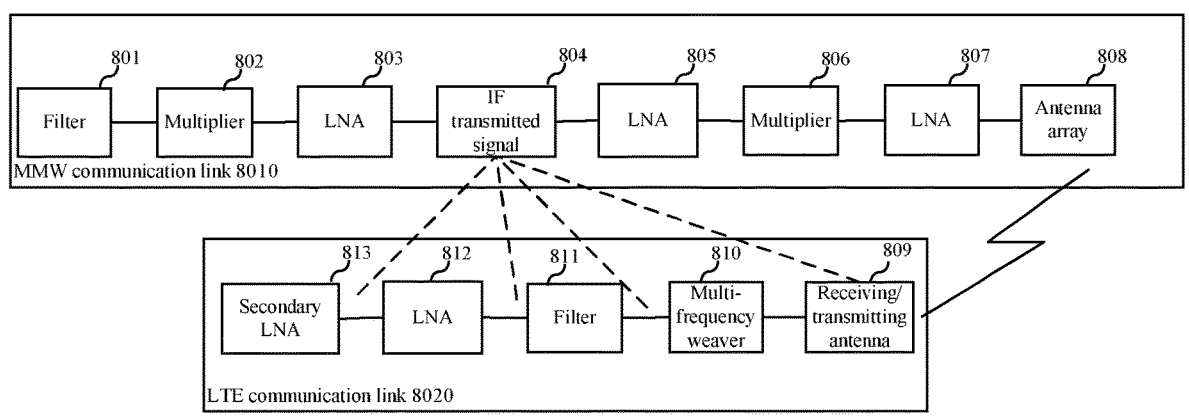
FIG. 8 is a structural block diagram when an interference exists between a Millimeter-Wave (MMW) communication link and a Long Term Evolution (LTE) communication link according to a sixth embodiment of the present disclosure.

For example, as shown in FIG. 8, links based on two different communication systems, i.e., an LTE communication link 8020 and an MMW communication link 8010, operate at the same time. As shown in FIG. 8, the MMW communication link 8010 includes a filter 801, a multiplier 802, a Low Noise Amplifier (LNA) 803, an Intermediate Frequency (IF) transmitted signal 804, an LNA 805, a multiplier 806, an LNA 807, and an antenna array 808, which are connected in sequence. The LTE communication link 8020 includes a secondary LNA 813, an LNA 812, a filter 811, a multi-frequency weaver 810, and a receiving/transmitting antenna 809.

When the LTE communication link serves as a transmitter for high-power transmission, and the MMW communication link 8010 serves a receiver for reception, a transmission noise of the LTE communication link 8020 may fall within an IF range of the MMW communication link 8010, and a multiple harmonic in the LTE communication link 8020 may reduce strength of the IF signal in the MMW communication link 8010 to worsen signal reception in the MMW communication link 8010, and may also worsen a value of an Error Vector Magnitude (EVM), SNR, or the like of the MMW communication link 8010 serving as the receiver. When the MMW communication link 8010 serves as a transmitter for transmission, and the LTE communication link 8020 serves as a receiver for reception, the IF transmitted signal 804 in the MMW communication link 8010 may affect the LNA 812, filter 811, multi-frequency weaver 810, etc., in the LTE communication link 8020 to worsen reception in the LTE communication link 8020. When the EN-DC interference detection module 7031 in the communication link adjustment apparatus 703 detects that current communication signal quality is not up to standard, or the user of the terminal thinks current communication signal quality is relatively poor, the communication link adjustment apparatus 703 may detect the MMW communication link 8010 and the LTE communication link 8020 first to determine which one is a main transmitter (i.e., an interfering end) and which one is a main receiver (i.e., an interfered end). When operating bands of the MMW communication link 8010 and the LTE communication link 8020 fall in an inter-modulation band or a harmonic band, namely there is a harmonic interference or inter-modulation interface between the MMW communication link 8010 and the LTE communication link 8020, the adaptive anti-interference control module 7036 needs to be started to adjust the communication links such that an isolation degree can meet a requirement for a wireless performance index, for example, the isolation degree between the communication links meets a requirement of 60 dB.

The EN-DC interference detection module 7031 is configured to acquire a current EN-DC interference condition of the terminal. As shown in FIG. 7, the EN-DC interference detection module 7031 is connected with the control chip 701, the interference self-scanning module 7032, and the interference determination module 7033. The control chip may be a radio frequency chip, or a baseband chip. When the terminal operates in the EN-DC scenario, whether there is any interference is detected first, and in a case where there is an interference, a type of the interference and a band combination condition are determined. For example, when it is detected that the wireless performance index declines, namely it is detected that a data transmission throughput of the communication link is lower than a data transmission throughput of the communication link in case of no interference, or it is found that there is obvious non-fluency during a call of the user, or main-diversity signal strength in a communication system used by the communication link is reduced (for example, the acquired signal strength is compared with a signal strength reference value in case of no interference, and in a case where the signal strength is less than the signal strength reference value, it indicates that the signal strength is reduced), an operating band and a received signal strength of the communication link may be acquired according to an enabled band and channel in the communication link. In a case where the received signal strength is beyond a range defined by a preset signal threshold, and the operating band of the communication link falls in the inter-modulation band or the harmonic band, it is determined that the operating band is an interfering band.

For example, in a case where an LTE communication link and NR communication link simultaneously exist in the terminal, there is an interference caused by the use of band B3 for the LTE communication link and band N78 for the NR communication link, or an interference caused by the use of band B41 for the LTE communication link and band N41 for the NR communication link. Alternatively, in a case where a WIFI communication link and NR communication link simultaneously exist in the terminal, there is an interference caused by the use of band N79 for the NR communication link. Alternatively, there is an interference caused by an MMW communication link and GPS communication link simultaneously existing in the terminal. The control chip, when detecting that the wireless performance index declines, may send an activation signal to the EN-DC interference detection module, such that the EN-DC interference detection module can determine an interfering band and basic wireless configuration information corresponding to the interference according to an enabled band or channel in the communication link. For example, whether there is an interference is determined by detecting any one or more of signal levels, RSSIs, or SNRs of a cellular communication link and an NR communication link. In a case where received signal strength is beyond a range defined by a preset signal threshold and the operating band falls in an inter-modulation band or a harmonic band, it is determined that the operating band is an interfering band, namely the operating band of the communication link is an EN-DC interfering point.

The interference self-scanning module 7032 is configured to scan the communication link with the interfering band to obtain an interference detection parameter. As shown in FIG. 7, the interference self-scanning module 7032 is connected with the EN-DC interference detection module 7031 and the interference determination module 7033. In some cases, the interference self-scanning module 7032 is further connected with an antenna unit and radio frequency transceiver in the terminal, and tests any one or more of: a channel, a path, and a power of the communication link with an interfering band to obtain an interference detection parameter. The interference detection parameter at least includes any one of an SNR, RSRP, and an RSSI. For example, an LTE communication link and an NR communication link are detected by an EN-DC harmonic detection algorithm based on a self-transmitting and self-receiving test mode of the intelligent terminal to obtain an interference detection parameter, such as a variation of any one of the RSSI, the RSRP, or the SNR. Then, the variation is compared with a corresponding reference value to obtain a comparison result. An interference type between the LTE communication link and the NR communication link is determined based on the comparison result. For example, when there is no interference, the LTE communication link and the NR communication link are tested respectively, and correspondingly obtained reference values of input signal levels are both −85 DB. When it is set that the LTE communication link serves as a transmitter and the NR communication link serves as a receiver, a signal level value of the NR communication link obtained by testing is −87 DB, and a variation of the input signal level is 2 DB. In such case, it indicates that there is currently a 2 DB harmonic interference between the two links. When it is set that the NR communication link serves as a transmitter and the LTE communication link serves as a receiver, a signal level value of the LTE communication link obtained by testing is −90 DB, and a variation of the input signal level is 5 DB. In such case, it indicates that there is currently a 5 DB harmonic interference between the two links.

Figure 9:
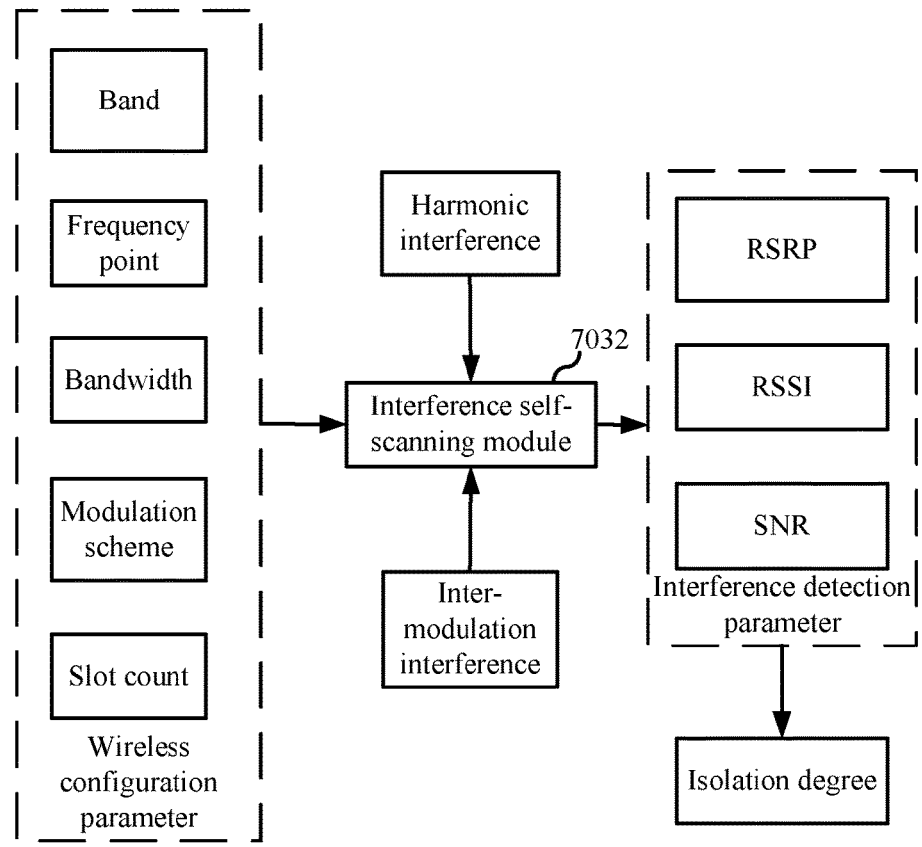
FIG. 9 is a block diagram of a parameter structure when an interference self-scanning module scans a communication link according to a sixth embodiment of the present disclosure.

As shown in FIG. 9, the interference self-scanning module 7032 scans the communication link according to a wireless configuration parameter of the communication link to obtain an interference detection parameter. The wireless configuration parameter includes multiple parameters such as a band, frequency point, bandwidth, RB count, slot count, modulation scheme, and multi-stream rank rate for the communication link. The interference detection parameter includes RSRP, an RSSI, an SNR, and other parameters. The interference self-scanning module 7032 scans the communication link in combination with an interference type (inter-modulation interference or harmonic interference) according to the wireless configuration parameter of the communication link to obtain the interference detection parameter. The isolation degree testing module 7034 may calculate the isolation degree value between the communication link and a current interfering link according to the interference detection parameter.

The isolation degree testing module 7034 is configured to calculate the isolation degree value between the communication link and a current interfering link according to the interference detection parameter. Each switch (such as a switch between a radio frequency chip and an intermediate-stage LNA) in the communication link or the current interfering link is controlled to enable or disable some channels or antennae to obtain an interference detection parameter in case of an interference by testing, and an isolation degree value between the communication link and the interfering link is further calculated according to the interference detection parameter.

For example, when a certain intelligent terminal has four antennae S1, S2, S3, and S4, S21 represents an isolation degree of antenna S2 relative to antenna S1, S31 represents an isolation degree of antenna S3 relative to antenna S1, and S41 represents an isolation degree of antenna S4 relative to antenna S1. Under software control, an acquired RSRP value is recorded R1 when only antenna S1 is enabled, and an acquired RSRP value is recorded as R2 when antenna S1 and antenna S2 are enabled at the same time. Then, the isolation degree between antenna S1 and antenna S2 is calculated through the following formula: isolation degree S21=(R2−R1)T, where T represents a correlation coefficient between RSRP and an isolation degree.

Similarly, when the four antennae operate at the same time, since distances between the antennae are different, correlations and couplings between the antennae are also different. All of antenna S2, antenna S3, and antenna S4 may affect antenna S1. During testing, switches of the four antennae are turned on first at the same time by software control, and an RSRP value is obtained by testing, represented as R1_234. Then, an isolation degree value of S1 when the four antennae exist is calculated through the following formula: S1-234=(R1_234−R1)T, where R1 represents the RSRP value acquired when only antenna S1 is enabled, and S1-234 represents an isolation degree of antenna S2, antenna S3, and antenna S4 relative to antenna S1. Multiple groups of antennae in the radio frequency link are controlled to be enabled or disabled so as to control the terminal to enter different transmitting and receiving modes to calculate radiation isolation degree values in the corresponding modes.

The interference determination module 7033 is configured to determine whether an interference between the communication links is caused by an isolation degree. In a case where the isolation degree of the communication link exceeds a range defined by a preset isolation degree threshold, the adaptive anti-interference control module 6036 needs to be invoked. For example, the preset isolation degree threshold is set to −20 DB. When the isolation degree of the communication link obtained by testing is lower than −20 DB, it indicates that the communication links are isolated well, and the communication link needs not to be adjusted. Otherwise, in a case where the isolation degree of the communication link obtained by testing is more than or equal to −20 DB, it indicates that the communication links are isolated not so well, and the communication link needs to be adjusted, thereby improving the isolation degree between the communication links and eliminate the interference.

The EN-DC scanning parameter storage module 7035 is configured to store the interference detection parameter obtained by the interference self-scanning module 7032 by scanning and the reference value of the interference detection parameter of each communication link in case of no interference. The EN-DC scanning parameter storage module 7035 is connected with the interference self-scanning module 7032 and the adaptive anti-interference control module 7036.

It is to be noted that the reference value of the interference detection parameter is each signal parameter value obtained by the terminal by testing in a case where there is no EN-DC interference, and the signal parameter value may be retrieved by the adaptive anti-interference control module 7036 in different test environments. In a case where a new wireless configuration parameter is detected by testing in a current network environment, the isolation degree adjustment mapping table needs to be updated for subsequent reference and retrieval.

The isolation degree display module 7037 is configured to display a current isolation degree between each channel and antenna in real time. As shown in FIG. 7, the isolation degree display module 7037 is connected with the adaptive anti-interference control module 7036.

For example, a path parameter, isolation degree value, etc., in the communication link are displayed. When the user selects different operating modes, or during debugging of a research and development person, the variation of the isolation degree value in the communication link can be observed through the isolation degree display module 7037, and then the communication link is further adjusted or switched actively and dynamically to select a path with a high isolation degree and subjected to a little interference as a current operating path, thereby improving the voice quality and the data throughput. For example, in a case where an LTE communication link and an NR communication link simultaneously exist in the terminal, the LTE communication link using band B3, and the NR communication link using band N78, there may be a relatively great interference. It is obtained by testing that an isolation degree value between the two links is lower than −10 DB, and a current downlink throughput is less than a preset threshold. When the user observes this condition through the isolation degree display module 7037, an operating band of the current communication link may be actively switched to N41, thereby reducing an EN-DC interference caused by the isolation degree and improving the downlink throughput.

The adaptive anti-interference control module 7036 is configured to wireless performance comparison judgment and adjustment and control of the interference in the communication link. As shown in FIG. 7, the adaptive anti-interference control module 7036 is connected with the EN-DC scanning parameter storage module 7035, the isolation degree display module 7037, and the isolation degree adjustment module 7038. When the interference determination module 7033 determines according to the scanning and testing results that there is an interference, the isolation degree adjustment module 7038 may be invoked to adjust the communication link. After the communication link is adjusted, whether the wireless performance index after adjustment is optimal may be determined. In a case where the wireless performance index after adjustment is optimal, link adjustment ends. In a case where the wireless performance index after adjustment is not optimal, the isolation degree adjustment module 7038 continues to be invoked to adjust the communication link.

The isolation degree adjustment module 7038 is configured to adjust and optimize the isolation degree. Each radio band may be divided into five channels, i.e., Transmission (TX), Primary Reception (PRX), Diversity Reception (DRX), PRX-MIMO, and DRX-MIMO channels. Since each radio frequency channel passes through a different radio frequency front-end active device of each stage, different radio frequency paths may be formed (for example, 4 to 20 radio frequency branch paths are formed), namely each band may include more than 20 radio frequency paths. After different EN-DC bands are combined (for example, when an LTE communication link and an NR communication link simultaneously exist in the terminal, the LTE communication link using band B3, and the NR communication link using band N78), many radio frequency paths and transmission paths may be formed. Due to different layouts on PCB hardware, there may be signal crosstalk between different radio frequency paths or transmission paths, resulting in a low isolation degree. In such case, in a case where DC testing is performed, a wireless performance index may be affected to great extents. The isolation degree adjustment module 7038 controls a multistage switch circuit through software to select and switch the radio frequency paths or transmission paths such that an operating path of a communication link subjected to an EN-DC interference may be switched from a channel with a low isolation degree to a channel with a high isolation degree, to improve the communication quality. As shown in FIG. 7, the isolation degree adjustment module 7038 is connected with the adaptive anti-interference control module 7036. The isolation degree adjustment module 7038 may include a transmission isolation degree adjustment submodule 70381 and a radiation isolation degree adjustment submodule 70382.

The transmission isolation degree adjustment submodule 70381 is configured to solve the problem of board-level isolation degree of EN-DC, such as isolation between radio frequency lines, isolation of vias, and isolation of reference ground wires. The radiation isolation degree adjustment submodule 70382 is configured to solve the problem of spatial radiation isolation degree, such as isolation of spatial couplings, and isolation degree between radio frequency antennae.

Figure 10:
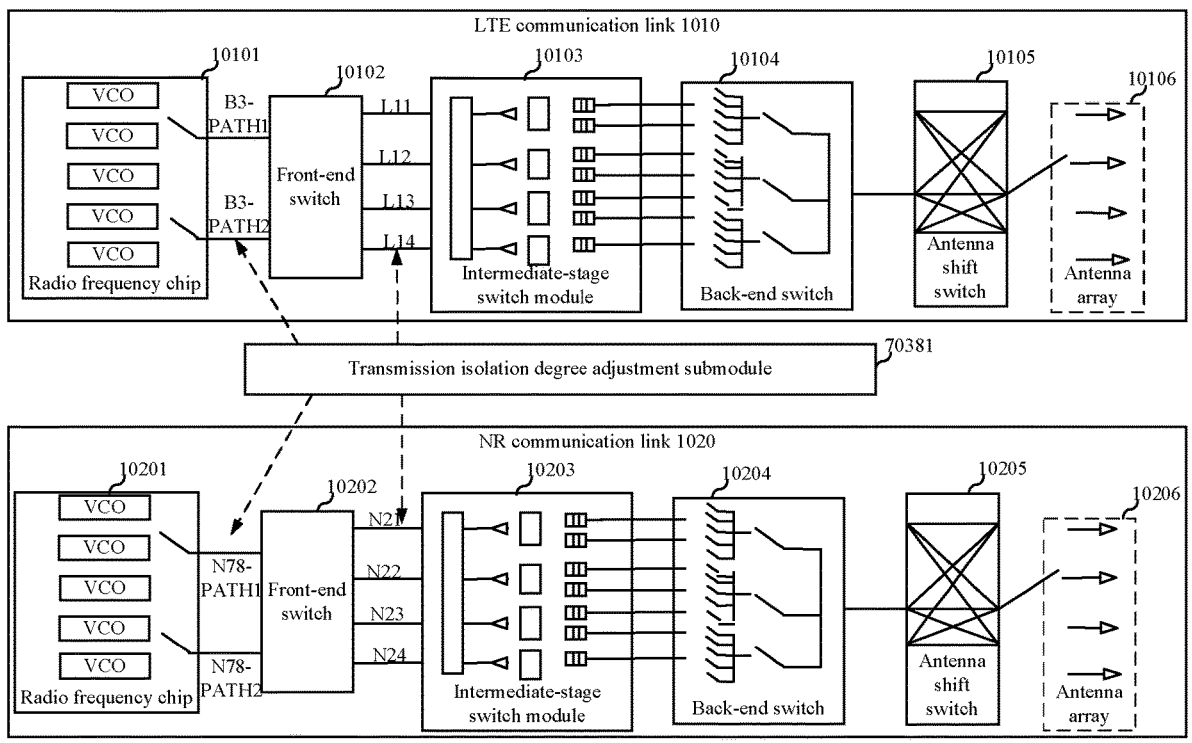
FIG. 10 is a structural block diagram that a transmission isolation degree adjustment submodule adjusts a transmission path in a communication link according to a sixth embodiment of the present disclosure.

In an exemplary implementation, FIG. 10 is a structural block diagram that the transmission isolation degree adjustment submodule adjusts a transmission path in a communication link. As shown in FIG. 10, when an LTE communication link 1010 serves as a transmitter, a signal generated by a Voltage-Controlled Oscillator (VCO) in a radio frequency chip 10101 in the LTE communication link 1010 needs to pass through multiple devices, such as a front-end switch 10102, an intermediate-stage switch module 10103, a back-end switch 10104, and an antenna shift switch 10105, so as to be transmitted to an antenna array 10106. Similarly, when an NR communication link 1020 serves as a transmitter, a signal generated by a VCO in a radio frequency chip 10201 in the NR communication link 1020 needs to pass through multiple devices, such as a front-end switch 10202, an intermediate-stage switch module 10203, a back-end switch 10204, and an antenna shift switch 10205, so as to be transmitted to an antenna array 10206.

There are two transmission paths between the radio frequency chip 10101 and the front-end back 10102, i.e., B3 PATH1 and B3 PATH2 respectively. There are four different transmission paths between the front-end switch 10102 and the intermediate-stage switch module 10103, i.e., L11, L12, L13, and L14 respectively. The above transmission paths may be arranged and combined to obtain eight different transmission paths, i.e., transmission path LP11 formed by B3 PATH1 and L11, transmission path LP12 formed by B3 PATH2 and L12, transmission path LP21 formed by B3 PATH1 and L12, transmission path LP22 formed by B3 PATH2 and L12, transmission path LP31 formed by B3 PATH1 and L13, transmission path LP32 formed by B3 PATH2 and L13, transmission path LP41 formed by B3 PATH1 and L14, and transmission path LP42 formed by B3 PATH2 and L14. Similarly, there are also eight different corresponding transmission paths in the NR communication link 1020, i.e., transmission path NP11 formed by N78 PATH1 and N21, transmission path NP22 formed by N78 PATH2 and N21, transmission path NP21 formed by N78 PATH1 and N22, transmission path NP22 formed by NP PATH2 and N22, transmission path NP31 formed by N78 PATH1 and N23, transmission path NP32 formed by N78 PATH2 and N23, transmission path NP41 formed by N78 PATH1 and N24, and transmission path NP42 formed by N78 PATH2 and N24. Correspondingly, there are different transmission paths between the intermediate-stage switch module and the back-end switch 10204 and between the antenna shift switch 10205 and the antenna 10206, as shown in FIG. 10, so that multiple different transmission paths may be selected to transmit a signal during the transmission of the signal. The transmission isolation degree adjustment submodule 70381 controls the above different transmission paths to be enabled and disabled to determine the specific transmission path to be selected for signal transmission, specifically as shown by the dotted line in FIG. 10.

An operating process of the transmission isolation degree adjustment submodule 70381 is as follows. In a case where transmission path LP11 in the LTE communication link 1010 and transmission path NP11 in the NR communication link 1020 are used for DC, the LTE communication link 1010 serves as a transmitter, the NR communication link 1020 serves as a receiver, and the interference self-scanning module 7032 scans the two communication links to learn that there is an EN-DC interference in this band combination, the adaptive anti-interference control module 7036 may invoke the transmission isolation degree adjustment submodule 70381 in the isolation degree adjustment module 7038 to switch transmission path LP11 in the LTE communication link to one of the other seven transmission paths. An isolation degree value between the transmission paths is calculated after adjustment. Then, the isolation degree value after adjustment is compared with a preset isolation degree threshold. In a case where it is determined that the isolation degree value after adjustment exceeds a range defined by the preset isolation degree threshold, the transmission path in the LTE communication link continues to be switched to another transmission path until the isolation degree value after adjustment meets a requirement for a wireless performance index. Similarly, the transmission path in the NR communication link may also be switched. For example, transmission path NR11 is switched to another transmission path with a high isolation degree and subjected to a little interference (such as transmission path NR31). Meanwhile, the isolation degree display module 7037 may display the isolation degree value, related transmission path, and other information of the current communication link in real time for testing adjustment. During specific implementation, a path switching instruction may be completed by controlling the switch array through a driver configuration program. The adjustment of the transmission path follows the following principle: a transmission path subjected to a little interference and with a high isolation degree is selected as an adjusting transmission path.

Figure 11:
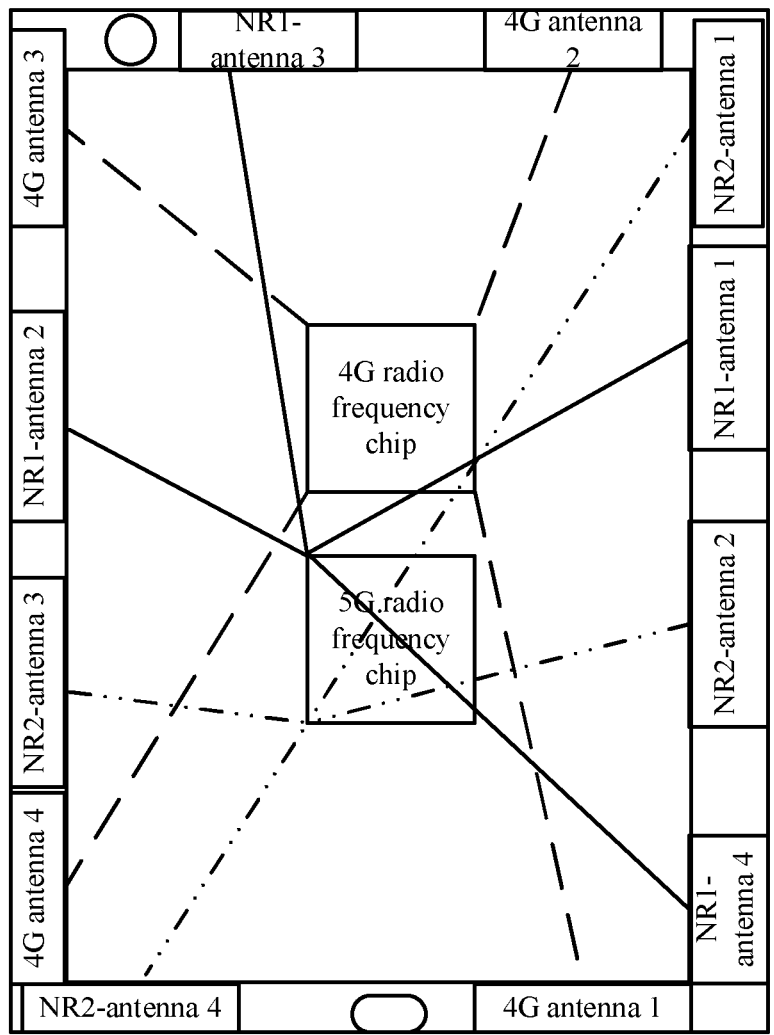
FIG. 11 is a structural block diagram of an antenna layout when a radiation isolation degree adjustment submodule adjusts a radiation path in a communication link according to a sixth embodiment of the present disclosure.

In an exemplary implementation, FIG. 11 is a structural block diagram of an antenna layout when the radiation isolation degree adjustment submodule adjusts a radiation path in a communication link. In FIG. 11, antennae controlled by a 4G radio frequency chip include 4G antenna 1, 4G antenna 2, 4G antenna 3, and 4G antenna 4, and antennae controlled by a 5G radio frequency chip include NR1 antenna 1, NR1 antenna 2, NR1 antenna 4, and NR1 antenna 4, as well as NR2 antenna 1, NR2 antenna 2, NR2 antenna 3, and NR2 antenna 4. In a self-transmitting and self-receiving test mode, the antenna controlled by the 4G radio frequency chip is used as a transmitting antenna, and the antenna controlled by the 5G radio frequency chip is used as a receiving antenna.

An operating process of the radiation isolation degree adjustment submodule 70382 is as follows. In a case where it is detected that an isolation degree value between 4G antenna 1 and NR1 antenna 4 exceeds a range defined by a preset isolation degree threshold, and the interference self-scanning module 7031 also scans an EN-DC interference in this band combination, the adaptive anti-interference control module 7036 may invoke the isolation degree adjustment module 7038 to switch 4G antenna 1 to another transmitting antenna (such as 4G antenna 3) controlled by the 4G radio frequency chip. An isolation degree value after switching is calculated. Then, the isolation degree value after switching is compared with a preset isolation degree threshold. In a case where it is determined that the isolation degree value after adjustment still exceeds the range defined by the preset isolation degree threshold, the antenna continues to be switched until a requirement for a wireless performance index is met. The adjustment of each antenna follows the following principle: an antenna with a high isolation degree, a strong correlation, and a low coupling is selected as an adjusting antenna.

Figure 12A:
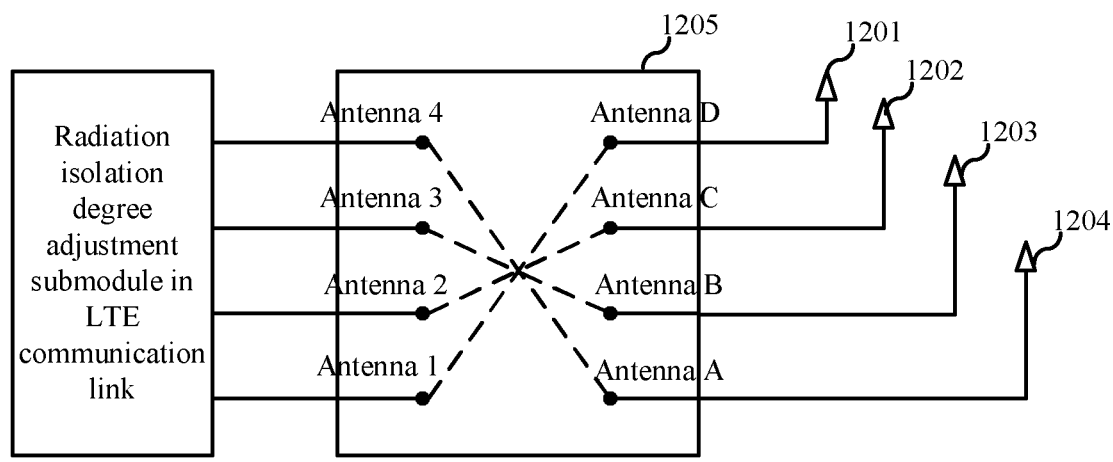
FIG. 12a is a structural block diagram of radiation paths in an LTE communication link according to a sixth embodiment of the present disclosure.
Figure 12B:
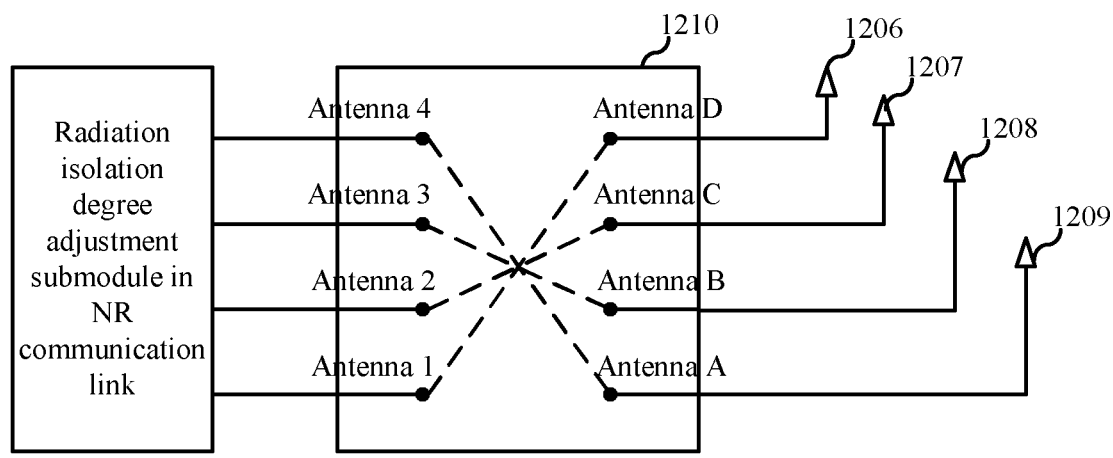
FIG. 12b is a structural block diagram of radiation paths in a New Radio (NR) communication link according to a sixth embodiment of the present disclosure.

In some cases, as shown in FIGS. 12*a* and 12*b*, FIG. 12*a* is a structural block diagram of radiation paths in an LTE communication link, and FIG. 12*b* is a structural block diagram of radiation paths in an NR communication link. When there is an interference, the radiation paths in the LTE communication link may be adjusted, or the radiation paths in the NR communication link may be adjusted. For example, the radiation path between antenna 4 and antenna A in a radiation path switch module 1205 may be adjusted to that between antenna 3 and antenna B under the control of a radiation isolation degree adjustment submodule in the LTE communication link, such that a signal is transmitted to an antenna 1203 through the adjusted radiation path, which changes a transmitting antenna of the LTE communication link. Alternatively, a radiation path between antenna 2 and antenna C in a radiation path switch module 1210 is adjusted to that between antenna 1 and antenna D under the control of a radiation isolation degree adjustment submodule in the NR communication link, such that a signal is transmitted to an antenna 1206 through the adjusted radiation path, which changes a transmitting antenna of the NR communication link. Therefore, a radiation isolation degree after adjustment is less than a preset isolation degree threshold, and the communication quality is improved.

In the present embodiment, the EN-DC interference detection module may be driven by an activation signal input by the control chip to detect and determine whether there is an interference as well as a type of the interference and a band combination condition. The interference self-scanning module scans a communication link with an interfering band to obtain an interference detection parameter, so as to provide an important basis for the isolation degree testing module to calculate the isolation degree value between the communication link and a current interfering link. After the interference determination module acquires the isolation degree value, whether the interference between the communication links is caused by an isolation degree is determined. In a case where the isolation degree of the communication link exceeds a range defined by a preset isolation degree threshold, it indicates that the interference is caused by the isolation degree, and the adaptive anti-interference control module is invoked to adjust the communication link until a requirement for a wireless performance index is met. Therefore, the communication quality of the communication link is improved, and the data throughput of the terminal is improved.

A seventh embodiment of the present disclosure relates to an electronic device, which includes:
  one or more processors; and
  a memory device, storing one or more programs which are executed by the one or more processors to cause the one or more processors to implement any above-mentioned communication link adjustment method.

An eighth embodiment of the present disclosure relates to a computer-readable medium storing a computer program which is executed by a processor to implement any above-mentioned communication link adjustment method.

It can be understood by those of ordinary skill in the art that all or some operations in the method disclosed above and function modules/units in the system and the apparatus may be implemented as software, firmware, hardware, or a proper combination thereof. In a hardware implementation, division of the function modules/units mentioned in the above descriptions does not necessarily correspond to division of physical components. For example, a physical component may have multiple functions, or a function or operation may be executed cooperatively by a plurality of physical components. Some physical components or all physical components may be implemented as software executed by a processor, such as a central processing unit, a digital signal processor, or a microprocessor, or implemented as hardware, or implemented as an integrated circuit, such as an application specific integrated circuit. Such software may be distributed in a computer-readable medium, which includes a computer storage medium (or a non-transitory medium) and a communication medium (or a temporary medium). As known to those of ordinary skill in the art, term computer storage medium includes volatile and nonvolatile as well as removable and irremovable media implemented in any method or technology to store information (such as computer-readable instructions, data structures, program modules, or other data). The computer storage medium includes, but not limited to, a Random Access Memory (RAM), a Read-Only Memory (ROM), an Electrically Erasable Programmable ROM (EEPROM), a flash memory or another memory technology, a Compact Disc Read-Only Memory (CD-ROM), a Digital Video Disk (DVD) or another optical disk, a cassette, a magnetic tape, a disk memory or another magnetic storage device, or any other medium that is configured to store desired information and accessed by a computer. In addition, it is known to those of ordinary skill in the art that the communication medium usually includes a computer-readable instruction, a data structure, a program module, or other data in modulated data signals of, for example, a carrier or another transmission mechanism, and may include any information delivery medium.

The exemplary embodiments have been disclosed herein. Specific terms are used, but they are only used and explained as general descriptive meanings rather than limitations. In some instances, it is apparent to those having ordinary skill in the art that, unless otherwise specified, features, properties, and/or elements described in combination with specific embodiments may be used independently or combined with features, properties, and/or elements described in combination with other embodiments.

What is claimed is:

1. A communication link adjustment method, comprising:
  acquiring interference information of a communication link under a multi-connection scenario;
  determining, according to the interference information, whether an isolation degree value of the communication link exceeds a range defined by a preset isolation degree threshold, wherein the isolation degree value comprises a transmission isolation degree value and a radiation isolation degree value; and
  in a case where the isolation degree value of the communication link exceeds the range defined by the preset isolation degree threshold, adaptively adjusting the communication link according to the isolation degree value and an isolation degree adjustment mapping table until the isolation degree value meets a requirement for a wireless performance index, wherein the isolation degree adjustment mapping table comprises a mapping relationship between isolation degree values and path parameters; wherein adjusting the communication link comprises: switching a transmission path and/or switching a radiation path.

2. The method according to claim 1, wherein determining, according to the interference information, whether the isolation degree value of the communication link exceeds the range defined by the preset isolation degree threshold comprises:
   detecting the communication link according to the interference information to obtain an interference detection parameter;
   calculating the isolation degree value between the communication link and a current interfering link according to the interference detection parameter;
   determining whether the isolation degree value exceeds the range defined by the preset isolation degree threshold.

3. The method according to claim 2, wherein detecting the communication link according to the interference information to obtain the interference detection parameter comprises:
   detecting the communication link in a self-transmitting and self-receiving test mode according to the interference information to obtain the interference detection parameter.

4. The method according to claim 2, wherein the interference information comprises any one or more of: a channel, a path, and a power of the communication link.

5. The method according to claim 2, wherein the interference detection parameter at least comprises any one of a Signal Noise Ratio (SNR), a Reference Signal Receiving Power (RSRP), or a Received Signal Strength Indication (RSSI).

6. The method according to claim 2, after calculating the isolation degree value between the communication link and the current interfering link according to the interference detection parameter and before determining whether the isolation degree value exceeds the range defined by the preset isolation degree threshold, further comprising:
   determining whether an interference is caused by an isolation degree; and
   in a case where the interference is caused by the isolation degree, establishing the isolation degree adjustment mapping table.

7. The method according to claim 6, after adaptively adjusting the communication link according to the isolation degree value and the isolation degree adjustment mapping table until the isolation degree value meets the requirement for the wireless performance index, further comprising:
   in a case where a new wireless configuration parameter is detected, updating the isolation degree adjustment mapping table,
   wherein the wireless configuration parameter comprises at least one of an operating band, a bandwidth, a Resource Block (RB) count, a slot count, and a modulation scheme.

8. The method according to claim 1, wherein determining, according to the interference information, whether the isolation degree value of the communication link exceeds the range defined by the preset isolation degree threshold comprises:
   detecting the communication link according to the interference information to determine an isolation degree type; and
   calculating an isolation degree value corresponding to the isolation degree type to obtain a calculation result, wherein the calculation result comprises that a transmission isolation degree value exceeds a range defined by a preset transmission isolation degree threshold, and/or, a radiation isolation degree value exceeds a range defined by a preset radiation isolation degree threshold.

9. The method according to claim 1, wherein acquiring the interference information of the communication link under the multi-connection scenario comprises:
   in a case where the wireless performance index declines, acquiring an operating band and a received signal strength of the communication link according to an enabled band and channel in the communication link; and
   in a case where the received signal strength is beyond a range defined by a preset signal threshold and the operating band falls in an inter-modulation band or a harmonic band, determining that the operating band is an interfering band in the interference information.

10. The method according to claim 9, wherein the wireless performance index at least comprises any one of a data throughput or a call voice quality.

11. The method according to claim 1, wherein the communication link under the multi-connection scenario at least comprises any two of a 4th Generation Mobile Communication Technology (4G)-based communication link, a 5th Generation Mobile Communication Technology (5G)-based communication link, a Global Positioning System (GPS)-based communication link, a Blue Tooth Communication Technology (BT)-based communication link, and a Wireless Fidelity Communication Technology (WIFI)-based communication link.

12. The method according to claim 1, further comprising:
   displaying the path parameter and the isolation degree value in real time.

13. An electronic device, comprising:
   one or more processors; and
   a memory device, storing one or more programs which are executed by the one or more processors to cause the one or more processors to implement the method according to claim 1.

14. A non-transitory computer-readable medium, storing a computer program which is executed by a processor to implement the operations of the method according to claim 1.

15. The method according to claim 1, wherein the communication link under the multi-connection scenario at least comprises any two of a 4th Generation Mobile Communication Technology (4G)-based communication link and a 5th Generation Mobile Communication Technology (5G)-based communication link.

16. A communication link adjustment apparatus, comprising a memory storing instructions and a processor in communication with the memory, wherein the processor is configured to execute the instructions to:
   acquire interference information of a communication link under a multi-connection scenario;
   determine, according to the interference information, whether an isolation degree value of the communication link exceeds a range defined by a preset isolation degree threshold, wherein the isolation degree value comprises a transmission isolation degree value and a radiation isolation degree value; and
   in a case where the isolation degree value of the communication link exceeds the range defined by the preset isolation degree threshold, adaptively adjust the communication link according to the isolation degree value and an isolation degree adjustment mapping table until the isolation degree value meets a requirement for a wireless performance index, wherein the isolation degree adjustment mapping table comprises a mapping relationship between isolation degree values and path parameters; wherein adjusting the communication link comprises: switching a transmission path and/or switching a radiation path.

17. The apparatus according to claim 16, wherein the processor, when being configured to determine, according to the interference information, whether an isolation degree value of the communication link exceeds a range defined by a preset isolation degree threshold, is configured to execute the instructions to:
   detect the communication link according to the interference information to obtain an interference detection parameter;
   calculate the isolation degree value between the communication link and a current interfering link according to the interference detection parameter;
   determine whether the isolation degree value exceeds the range defined by the preset isolation degree threshold.

18. The apparatus according to claim 17, wherein the processor, when being configured to detect the communication link according to the interference information to obtain the interference detection parameter, is configured to execute the instructions to:
   detect the communication link in a self-transmitting and self-receiving test mode according to the interference information to obtain the interference detection parameter.

19. The apparatus according to claim 16, wherein the processor, when being configured to determine, according to the interference information, whether the isolation degree value of the communication link exceeds the range defined by the preset isolation degree threshold, is configured to execute the instructions to:
   detect the communication link according to the interference information to determine an isolation degree type, wherein the isolation degree type comprises a transmission isolation degree and a radiation isolation degree; and
   calculate an isolation degree value corresponding to the isolation degree type to obtain a calculation result, wherein the calculation result comprises that a transmission isolation degree value exceeds a range defined by a preset transmission isolation degree threshold, and/or, a radiation isolation degree value exceeds a range defined by a preset radiation isolation degree threshold.

\* \* \* \* \*